US011652958B1

(12) United States Patent
Geddes et al.

(10) Patent No.: US 11,652,958 B1
(45) Date of Patent: May 16, 2023

(54) INTERACTIONS WITH OBJECTS WITHIN VIDEO LAYERS OF A VIDEO CONFERENCE

(71) Applicant: Zoom Video Communications, Inc., San Jose, CA (US)

(72) Inventors: Graeme Lambourne Geddes, Aliso Viejo, CA (US); Brendan James Ittelson, San Jose, CA (US); Shawn Michael Rolin, San Jose, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/976,288

(22) Filed: Oct. 28, 2022

(51) Int. Cl.
*H04N 7/15* (2006.01)
*H04N 7/14* (2006.01)
*G06F 16/955* (2019.01)
*H04L 12/18* (2006.01)

(52) U.S. Cl.
CPC ......... *H04N 7/152* (2013.01); *G06F 16/9566* (2019.01); *H04L 12/1822* (2013.01); *H04N 7/147* (2013.01); *H04N 7/157* (2013.01)

(58) Field of Classification Search
None
See application file for complete search history.

(56) References Cited

U.S. PATENT DOCUMENTS

| 9,544,543 | B2 | 1/2017 | Setton | |
|---|---|---|---|---|
| 9,864,734 | B2* | 1/2018 | Chitta | G06F 40/279 |
| 9,961,404 | B2 | 5/2018 | Mallinson | |
| 10,638,194 | B2* | 4/2020 | Ozkan | H04N 21/23412 |
| 10,835,828 | B1* | 11/2020 | Pather | A63F 13/213 |
| 10,999,640 | B2* | 5/2021 | Rakshit | H04N 21/8586 |
| 2009/0089849 | A1* | 4/2009 | Jefremov | H04N 21/4436 725/118 |
| 2020/0226672 | A1* | 7/2020 | Dillon | H04N 7/141 |
| 2021/0400142 | A1* | 12/2021 | Jorasch | H04M 3/567 |

OTHER PUBLICATIONS

Forbes, Warmly Launches Free App for Zoom, Announces Fresh $2.4 Million In Additional Funding, Rashi Shrivastava, Jul. 22, 2021, 2 pages.
Cloudinary, Enhancing Video With AI-Powered Interactive Zooming, Mickey Aharony, Apr. 20, 2022, 2 pages.

* cited by examiner

*Primary Examiner* — Stella L. Woo
(74) *Attorney, Agent, or Firm* — Young Basile Hanlon & MacFarlane, P.C.

(57) ABSTRACT

Interactions with objects depicted within video streams displayed during a video conference are detected to cause information associated with the interacted objects to be presented. During a video conference, multiple video layers of a video stream obtained from a first participant device connected to the video conference are identified. An interaction with an object within one of those multiple video layers is detected during the video conference, in which the interaction is from a second participant device connected to the video conference. Based on the interaction, information associated with the object is presented during the video conference within a graphical user interface associated with the video conference. The video stream may, for example, initially include a background layer, a foreground layer, and an overlay layer. Interactive video layers corresponding to each of those initial layers may be introduced to receive interactions with objects depicted therein.

20 Claims, 11 Drawing Sheets

US 11,652,958 B1

INTERACTIONS WITH OBJECTS WITHIN VIDEO LAYERS OF A VIDEO CONFERENCE

FIELD

This disclosure generally relates to video conferencing, and, more specifically, to enabling interactions with objects within video layers of video streams displayed during a video conference.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
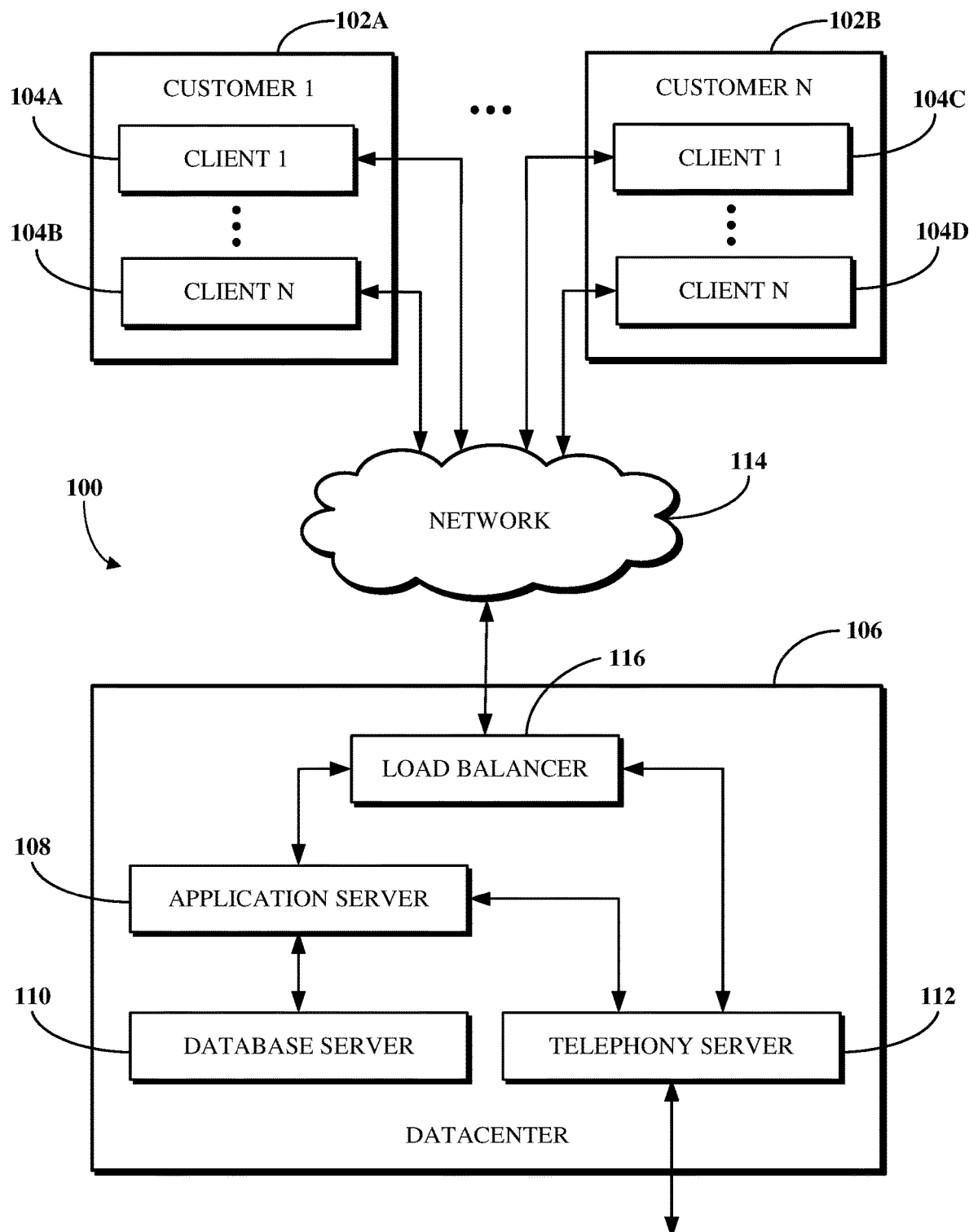
FIG. 1 is a block diagram of an example of an electronic computing and communications system.

Conferencing software is frequently used across various industries to support video-enabled conferences between participants in multiple locations. In some cases, each of the conference participants separately connects to the conferencing software from their own remote locations. In other cases, one or more of the conference participants may be physically located in and connect to the conferencing software from a conference room or similar physical space (e.g., in an office setting) while other conference participants connect to the conferencing software from one or more remote locations. Conferencing software thus enables people to conduct video conferences without requiring them to be physically present with one another. Conferencing software may be available as a standalone software product or it may be integrated within a software platform, such as a unified communications as a service (UCaaS) platform.

The conferencing software implementing a video conference obtains video streams from devices of conference participants, processes the video streams for formatting and bandwidth control, and transmits the processed video streams to the various participant devices for display thereat. Generally, a video stream obtained from a device of a conference participant and displayed during a video conference depicts the conference participant, so that the many participants can see and therefore more personally interact with one another despite being remote from one another. However, a video stream may depict content beyond or other than the conference participant. For example, a video stream may depict one or more objects behind, next to, or otherwise nearby to the subject conference participant. Examples of such objects include, but are not limited to, decorations (e.g., art, diplomas, or tchotchkes), furniture (e.g., chairs, desks, or bookshelves), and personal items (e.g., books, family pictures, or electronic devices).

A participants of a video conference may wish to learn more about the contents depicted within a video stream of another participant during the video conference. For example, an object appearing behind a participant within a video stream may be something another participant is interested in purchasing. In another example, a participant may simply be curious about that object and want to know more about it, independent of any interest in purchasing it. Because conventional video conferencing approaches do not enable interactions with participant video streams, the interested participant (i.e., the participant interested in the object) must communicate with the participant whose video stream includes the object to ask about the object, either by asking about the object out loud during the conference or by sending a message within a chat or like window of the video conference. However, both of these approaches suffer drawbacks. For example, speech may disrupt a discussion during the video conference, especially where the discussion does not involve the interested participant, or may be misheard and require repeating, thereby taking more time away from the subject of the video conference. In another example, chat or other messages may not be seen by the participant to whom they are directed until much later during the video conference, thereby either delaying or entirely precluding a response. In yet another example, with speech or messaging, even where the party to whom the speech or message is directed timely perceives the speech or message, it is possible that they will not know enough about the object to satisfy the interested party.

Implementations of this disclosure address problems such as these using an interactive video layer system which enables interactions with objects within video layers of video streams displayed during a video conference. During a video conference, multiple video layers of a video stream obtained from a first participant device connected to the video conference are identified. A video stream obtained from a participant device (i.e., a device of a participant of the video conference) may be considered to include one or more video layers, for example, a background layer (e.g., a virtual background or a portion of a video stream showing an actual background), a foreground layer (e.g., showing the human participant(s) and any objects held thereby; sometimes referred as the human layer), and an overlay layer (e.g., showing participant, company, or information, such as in text and/or images). For each initial video layer of the video stream, the interactive video layer system generates an interactive video layer which enables interactions with objects within the corresponding video layer. For example, a first interactive video layer may correspond to the background layer and enable interactions with objects shown within the video background, while a second interactive video layer may correspond to a foreground layer and enable interactions with objects shown within the video foreground.

An interaction with an object within one of those multiple video layers is detected during the video conference, in which the interaction is from a second participant device connected to the video conference. Based on the interaction, information associated with the object is presented during the video conference within a GUI associated with the video conference. That is, interactions within an object may trigger one or more events to occur, such as the presentation of a pop-up window including embedded information from an external source (e.g., an online encyclopedia article or online marketplace listing) or a hyperlink to such an external source, a graphic showing information associated with the object or with an event corresponding to the interaction with the object (e.g., poll results showing votes of objects within a participant video stream based on numbers of interactions therewith), or an option to share information associated with the interacted object over a modality separate from the video conference (e.g., another communication approach enabled by a UCaaS platform or other platform which implements the video conference). The types of interactive objects, interactive video layers, and degrees of interaction (e.g., what happens when something is interacted with) may be configured by a host of the video conference or another participant thereof.

The implementations of this disclosure enable interactions with objects within video layers during many different video conference settings. In one example, interactive video layers may be used with a participant-to-participant video conference (e.g., a conventional video conference between two or more given people), in which participants may have their own user interface tiles and video streams, connect from their own participant devices, have similar meeting controls, be or be granted host privileges, or the like. In another example, interactive video layers may be used with a contact center engagement video conference in which one participant to the video conference is a contact center user who is accessing a contact center over a video modality and another participant to the video conference is a contact center agent who works with or otherwise for the contact center to address queries from contact center users. In yet another example, interactive video layers may be used with an online learning video conference in which multiple participants are recognized generally as audience participants and one or more select participants are recognized generally as leader participants (e.g., for educational, webinar, or other purposes).

To describe some implementations in greater detail, reference is first made to examples of hardware and software structures used to implement an interactive video layer system. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
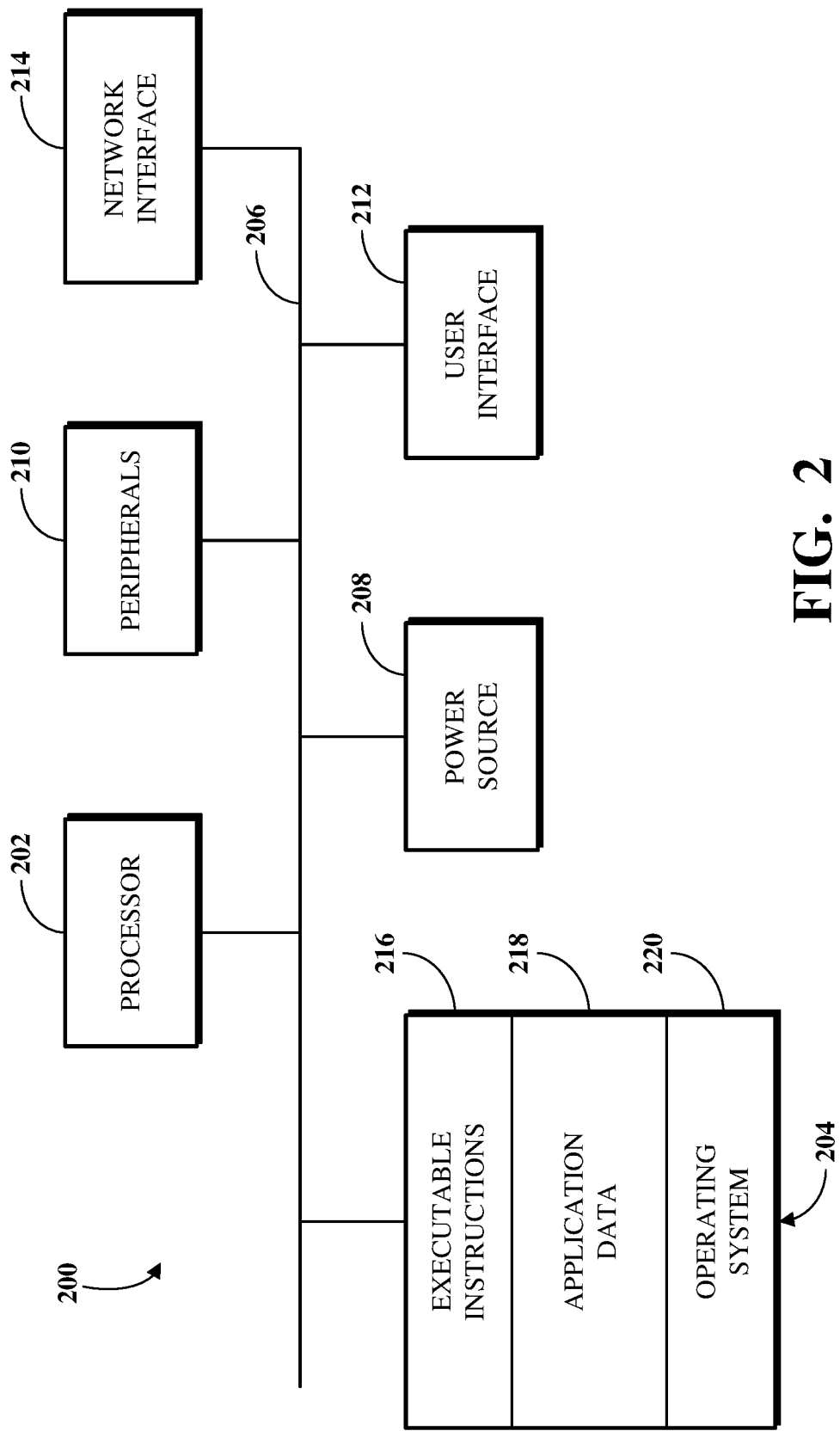
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
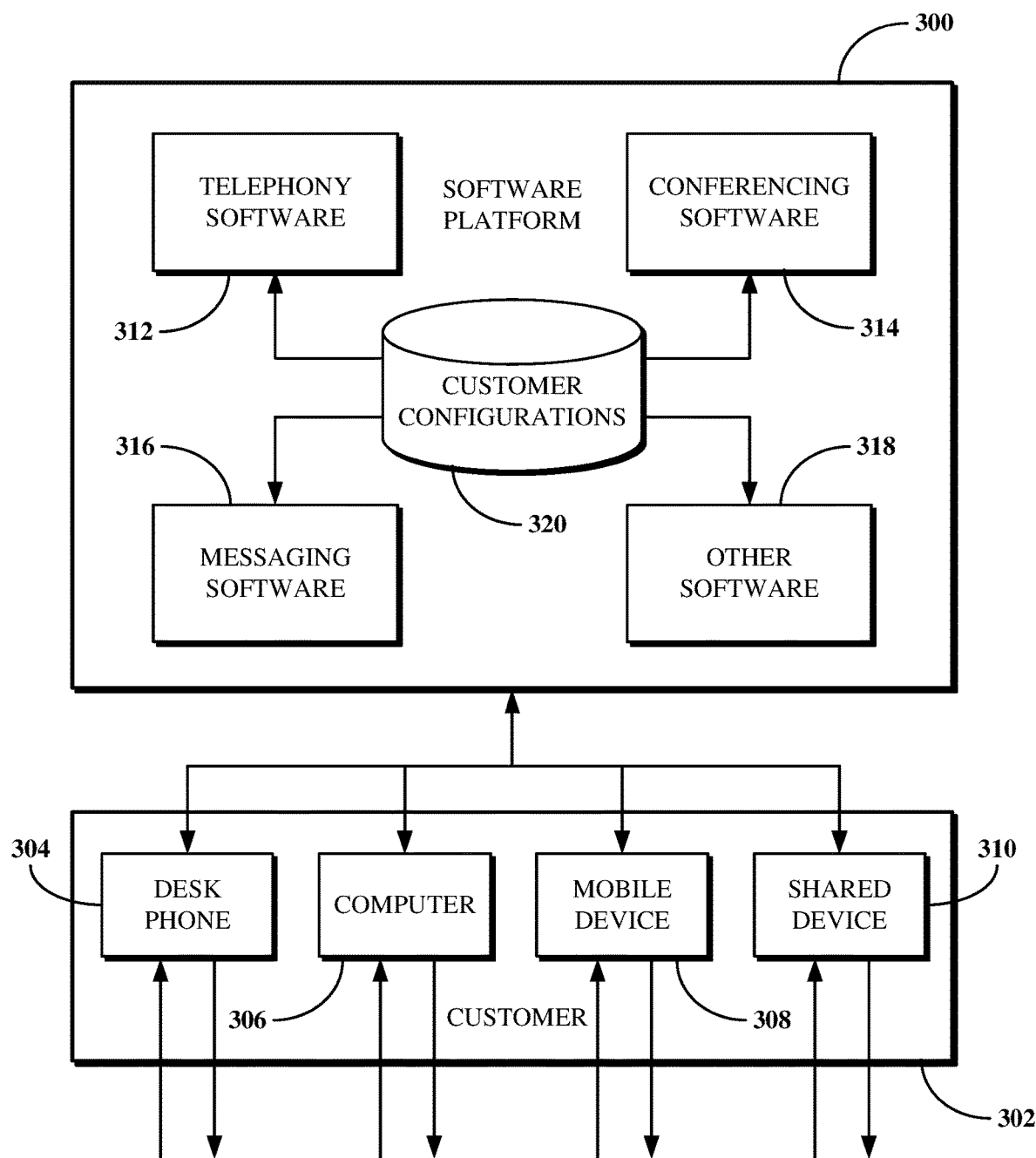
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include interactive video layer software for enabling interactions with objects within video layers of video streams displayed during a video conference. In some such cases, the other software 318 may be or be included in the conferencing software 314.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
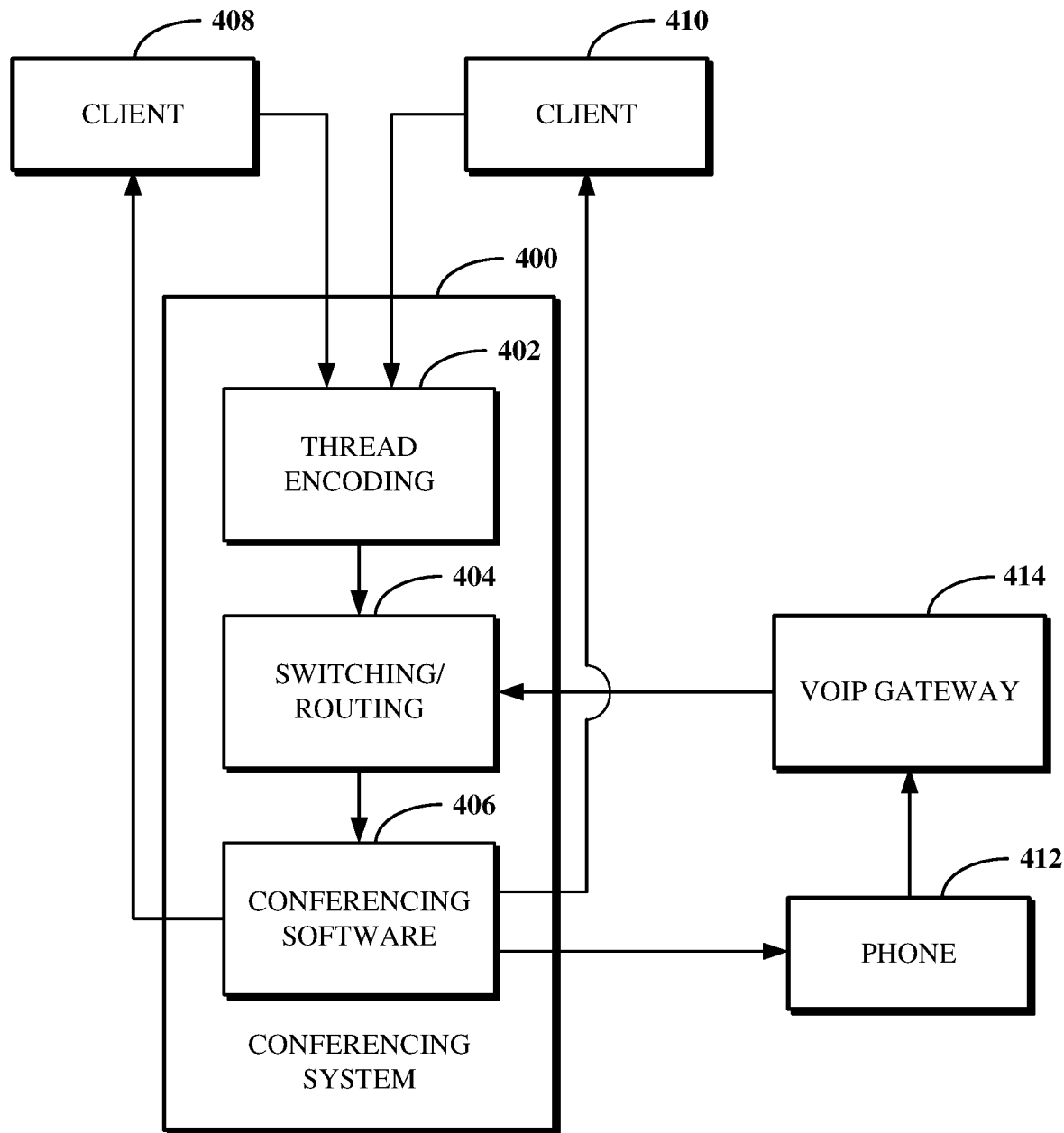
FIG. 4 is a block diagram of an example of a conferencing system for delivering conferencing software services in an electronic computing and communications system.

FIG. 4 is a block diagram of an example of a conferencing system 400 for delivering conferencing software services in an electronic computing and communications system, for example, the system 100 shown in FIG. 1. The conferencing system 400 includes a thread encoding tool 402, a switching/routing tool 404, and conferencing software 406. The conferencing software 406, which may, for example, the conferencing software 314 shown in FIG. 3, is software for implementing conferences (e.g., video conferences) between users of clients and/or phones, such as clients 408 and 410 and phone 412. For example, the clients 408 or 410 may each be one of the clients 304 through 310 shown in FIG. 3 that runs a client application associated with the conferencing software 406, and the phone 412 may be a telephone which does not run a client application associated with the conferencing software 406 or otherwise access a web application associated with the conferencing software 406. The conferencing system 400 may in at least some cases be implemented using one or more servers of the system 100, for example, the application server 108 shown in FIG. 1. Although two clients and a phone are shown in FIG. 4, other numbers of clients and/or other numbers of phones can connect to the conferencing system 400.

Implementing a conference includes transmitting and receiving video, audio, and/or other data between clients and/or phones, as applicable, of the conference participants. Each of the client 408, the client 410, and the phone 412 may connect through the conferencing system 400 using separate input streams to enable users thereof to participate in a conference together using the conferencing software 406. The various channels used for establishing connections between the clients 408 and 410 and the phone 412 may, for example, be based on the individual device capabilities of the clients 408 and 410 and the phone 412.

The conferencing software 406 includes a user interface tile for each input stream received and processed at the conferencing system 400. A user interface tile as used herein generally refers to a portion of a conferencing software user interface which displays information (e.g., a rendered video) associated with one or more conference participants. A user interface tile may, but need not, be generally rectangular. The size of a user interface tile may depend on one or more factors including the view style set for the conferencing software user interface at a given time and whether the one or more conference participants represented by the user interface tile are active speakers at a given time. The view style for the conferencing software user interface, which may be uniformly configured for all conference participants by a host of the subject conference or which may be individually configured by each conference participant, may be one of a gallery view in which all user interface tiles are similarly or identically sized and arranged in a generally grid layout or a speaker view in which one or more user interface tiles for active speakers are enlarged and arranged in a center position of the conferencing software user interface while the user interface tiles for other conference participants are reduced in size and arranged near an edge of the conferencing software user interface. In some cases, the view style or one or more other configurations related to the display of user interface tiles may be based on a type of video conference implemented using the conferencing software 406 (e.g., a participant-to-participant video conference, a contact center engagement video conference, or an online learning video conference, as will be described below).

The content of the user interface tile associated with a given participant may be dependent upon the source of the input stream for that participant. For example, where a participant accesses the conferencing software 406 from a client, such as the client 408 or 410, the user interface tile associated with that participant may include a video stream captured at the client and transmitted to the conferencing system 400, which is then transmitted from the conferencing system 400 to other clients for viewing by other participants (although the participant may optionally disable video features to suspend the video stream from being presented during some or all of the conference). In another example, where a participant access the conferencing software 406 from a phone, such as the phone 412, the user interface tile for the participant may be limited to a static image showing text (e.g., a name, telephone number, or other identifier associated with the participant or the phone 412) or other default background aspect since there is no video stream presented for that participant.

The thread encoding tool 402 receives video streams separately from the clients 408 and 410 and encodes those video streams using one or more transcoding tools, such as to produce variant streams at different resolutions. For example, a given video stream received from a client may be processed using multi-stream capabilities of the conferencing system 400 to result in multiple resolution versions of that video stream, including versions at 90p, 180p, 360p, 720p, and/or 1080p, amongst others. The video streams may be received from the clients over a network, for example, the network 114 shown in FIG. 1, or by a direct wired connection, such as using a universal serial bus (USB) connection or like coupling aspect. After the video streams are encoded, the switching/routing tool 404 direct the encoded streams through applicable network infrastructure and/or other hardware to deliver the encoded streams to the conferencing software 406. The conferencing software 406 transmits the encoded video streams to each connected client, such as the clients 408 and 410, which receive and decode the encoded video streams to output the video content thereof for display by video output components of the clients, such as within respective user interface tiles of a user interface of the conferencing software 406.

A user of the phone 412 participates in a conference using an audio-only connection and may be referred to an audio-only caller. To participate in the conference from the phone 412, an audio signal from the phone 412 is received and processed at a VOIP gateway 414 to prepare a digital telephony signal for processing at the conferencing system 400. The VOIP gateway 414 may be part of the system 100, for example, implemented at or in connection with a server of the datacenter 106, such as the telephony server 112 shown in FIG. 1. Alternatively, the VOIP gateway 414 may be located on the user-side, such as in a same location as the phone 412. The digital telephony signal is a packet switched signal transmitted to the switching/routing tool 404 for delivery to the conferencing software 406. The conferencing software 406 outputs an audio signal representing a combined audio capture for each participant of the conference for output by an audio output component of the phone 412. In some implementations, the VOIP gateway 414 may be omitted, for example, where the phone 412 is a VOIP-enabled phone.

A conference implemented using the conferencing software 406 may be referred to as a video conference in which video streaming is enabled for the conference participants thereof. The enabling of video streaming for a conference participant of a video conference does not require that the conference participant activate or otherwise use video functionality for participating in the video conference. For example, a conference may still be a video conference where none of the participants joining using clients turns on their video stream for any portion of the conference. In some cases, however, the conference may have video disabled, such as where each participant connects to the conference using a phone rather than a client, or where a host of the conference selectively configures the conference to exclude video functionality.

The conferencing system 400 may be used to implement a video conference in any of a variety of possible use cases. For example, the conferencing system 400 can implement a participant-to-participant video conference in which participants as end users of the conferencing software 406 may have their own user interface tiles and video streams, connect from their own participant devices (e.g., the client 408 or the client 410), have similar meeting controls, be or be granted host privileges, or the like. A participant-to-participant video conference as referred to herein may thus be recognized as a conventional video conference between two or more given people. In another example, the conferencing system 400 can implement a contact center engagement video conference in which one participant to the video conference is a contact center user who is accessing a contact center over a video modality facilitated wholly or partially using the conferencing software 406 and another participant to the video conference is a contact center agent who works with or otherwise for the contact center to address queries from contact center users. In some such cases, the conferencing system 400 may be implemented within a contact center service to deliver real-time communications over a video modality of the contact center. In yet another example, the conferencing system 400 can implement an online learning video conference in which multiple participants are recognized generally as audience participants and one or more select participants are recognized generally as leader participants. An online learning video conference may, for example, be used for educational purposes (e.g., virtual classes for online-capable schools), webinar purposes, or other lecture- or presentation-type purposes. Other examples of video conferences implementable using the conferencing system 400 are possible.

In some implementations, other software services may be accessible in connection with a conference implemented using the conferencing system 400. For example, a conference may include or otherwise integrate functionality for instant messaging, unified messaging, and other types of messaging communications between participants of the conference, such as to facilitate a chat or like virtual conversation between users of those participants. Those other software services may be implemented at the conferencing system 400 and/or a different aspect of the system 100.

Figure 5:
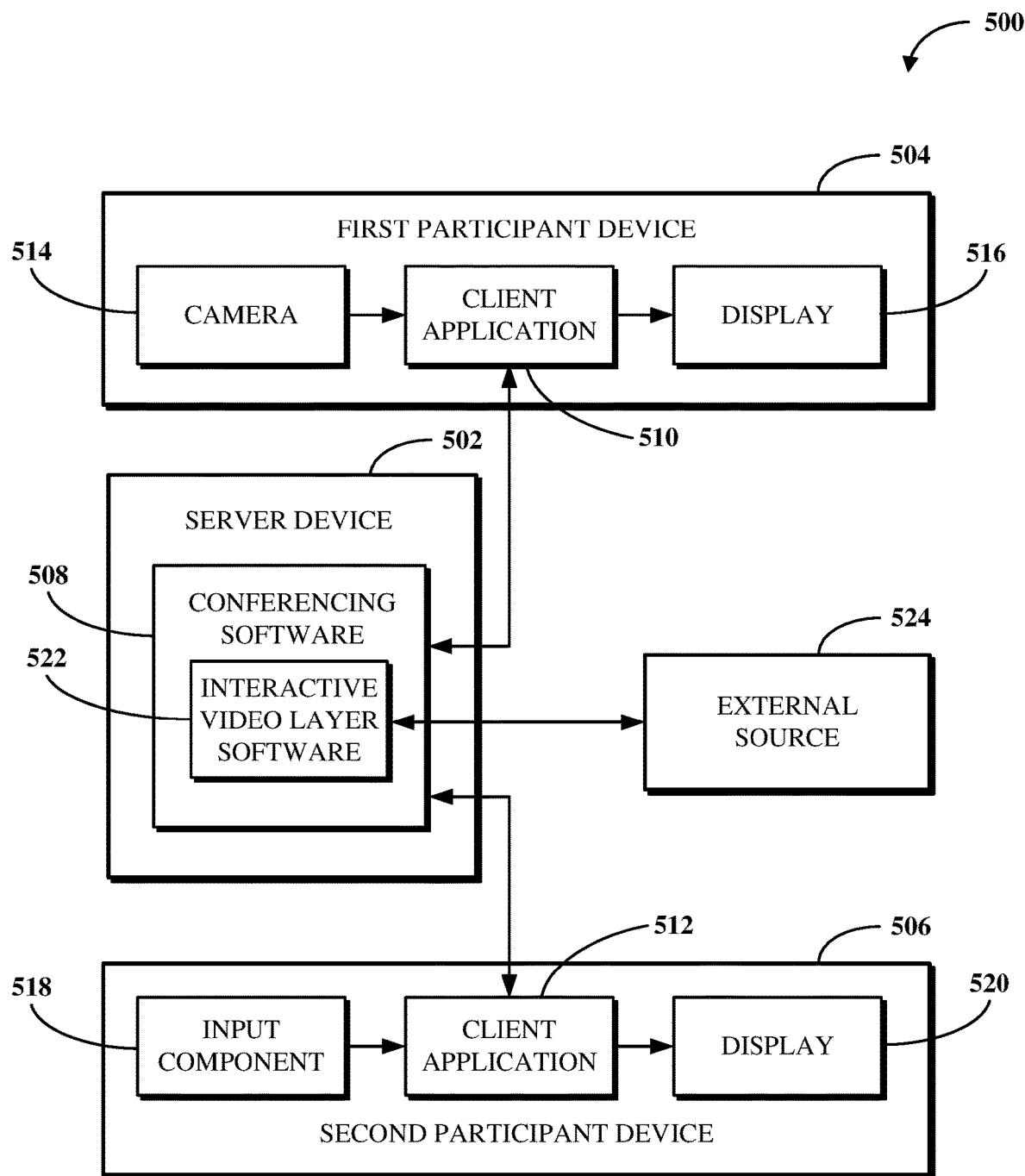
FIG. 5 is a block diagram of an example of an interactive video layer system.

FIG. 5 is a block diagram of an example of an interactive video layer system 500. The system 500 includes a server device 502, a first participant device 504, and a second participant device 506 Each of the first participant device 504 and the second participant device 506 may, for example, be one of the clients 408 or 410 shown in FIG. 4. The first participant device 504 and the second participant device 506 are devices used by conference participants to connect to and participate in a video conference implemented by conferencing software 508 at the server device 502. The conferencing software 508 may, for example, be the conferencing software 406 shown in FIG. 4. While two participant devices 504 and 506 are shown as connecting to a video conference implemented by the conferencing software 508 in a non-limiting example, in some implementations, other numbers of participant devices may be so connected.

The first participant device 504 connects to the conferencing software 508 using a client application 510 and the second participant device 506 connects to the conferencing software 508 using a client application 512. In particular, the client application 510 and the client application 512 are client-side software applications used to connect the first participant device 504 and the second participant device 506, respectively, to the video conference implemented by the conferencing software 508. For example, the client application 510 and the client application 512 may be different instances, installations, or versions of a same software application, in which one is present at the first participant device 504 and the other is present at the second participant device 506. In another example, the client application 510 and the client application 512 may be different software applications altogether. The client application 510 and/or the client application 512 may, for example, be a desktop software application, mobile application, or web application associated with one or more services of a software platform, for example, the software platform 300 shown in FIG. 3. For example, the client application 510 or the client application 512 may be software that allows a user of the first participant device 504 or the second participant device 506, respectively, to access or otherwise use one or more of the software 312 through 318 shown in FIG. 3. In some implementations, the client application 510 and/or the client application 512 may be a web-based application accessible via a web browser of the first participant device 504 and/or the second participant device 506, respectively.

Each of the first and second participant devices 504 and 506 includes components used for or otherwise during the video conference. In particular, the first participant device 504 includes a camera 514 and a display 516, and the second participant device 506 includes an input component 518 and a display 520. The display 516 and the display 520 are computer displays configured to output content of the video conference for viewing by users of the first participant device 504 and the second participant device 506, respectively. For example, the display 516 and/or the display 520 may be an integrated (e.g., built-in) display of the first participant device 504 or the second participant device 506, respectively, or may connect to the first participant device 504 or the second participant device 506 using a port, such as via a USB or a high definition multimedia interface (HDMI) connection. The camera 514 is a component configured to capture a video stream at the first participant device 504, which video stream will be transmitted to the conferencing software 508 for display to the various participants of the video conference during the video conference. For example, the camera 514 may be an integrated (e.g., built-in) camera of the first participant device 504 or may connect to the first participant device 504 using a port, such as via a USB connection. The input component 518 is a component configured to capture input from a user of the second participant device 506, which input may be processed by the client application 512 in connection with the video conference. For example, the input component 518 may be a keyboard, a mouse, or a touchscreen (e.g., the display 520 itself, as applicable). While the first participant device 504 is not shown as including an input component 518 and the second participant device 506 is not shown as including a camera, in at least some cases, the first participant device 504 will also include an input component and/or the second participant device 506 will also include a camera.

The conferencing software 508 includes or otherwise uses interactive video layer software 522 to enable interactions with objects within video layers of video streams displayed during a video conference implemented using the conferencing software 508. In particular, the interactive video layer software 522 enables one or more objects located in any of multiple video layers of a video stream a participant device connected to the video conference to be interacted with from other participant devices connected to the video conference.

The interactive video layer software 522 will in particular be described with respect to FIG. 5 by non-limiting example as enabling interactions with a video stream of the first participant device 504, captured by the camera 514 and processed using the client application 510, from the second participant device 506, using the input component 518. The interactive video layer software 522 processes the video stream from the first participant device 504 to identify multiple video layers of that video stream, including video layers initially included in the video stream when same is obtained at the server device 502 (e.g., by the conferencing software 508) from the first participant device 504 and video layers added to the video stream by the interactive video layer software 522 to correspond to those initial video layers. The interactive video layer software 522 detects an interaction from the second participant device 506 within an object within one of the multiple video layers identified for the video stream from the first participant device 504. Based on that interaction, the interactive video layer software 522 determines (e.g., identifies, generates, retrieves, computes, or accesses) information associated with the object and presents that information within a GUI associated with the video conference implemented by the conferencing software 508. For example, the GUI within which the information associated with the object is presented may be a GUI which includes a user interface tile within which the video stream from the first participant device 504 is displayed. In particular, the information associated with the object may be presented within that user interface tile during the video conference, for example, as an overlay, annotation, or other content element alongside the video stream itself.

While the interactive video layer software 522 is shown and described as being included within the conferencing software 508, in some implementations, the interactive video layer software 522 or a portion thereof may be external to the conferencing software 508. For example, the interactive video layer software 522 may in some cases represent functionality of a software platform which includes the conferencing software 508 (e.g., the software platform 300) external to but otherwise for use with the conferencing software 508. In another example, the interactive video layer software 522 may be implemented at a participant device, such as within the client application 510 and/or the client application 512. In one example where the interactive video layer software 522 is implemented at a participant device (e.g., within a client application running at that device or otherwise), the user of that participant device may cause their video stream to be interactive by enabling interactions with their video stream generally, such as via a user interface element (e.g., a meeting control) of the video conference, or by asserting configurations indicating one or more objects with which to enable or limit interactions from other participant devices. In another example where the interactive video layer software 522 is implemented at a participant device, the user of that participant device may cause the video stream from another participant device to become interactive using a user interface element of the video conference or by performing an interaction with that video stream (e.g., clicking on a portion thereof corresponding to an object using a mouse of the participant device). In some such cases, a notification may be transmitted to the participant device from which the interacted video stream derived to inform a user thereof that their video stream is being interacted with. In some such cases, the notification may identify the interacted object or otherwise the portion of the video stream within which the interaction occurred.

Figure 6:
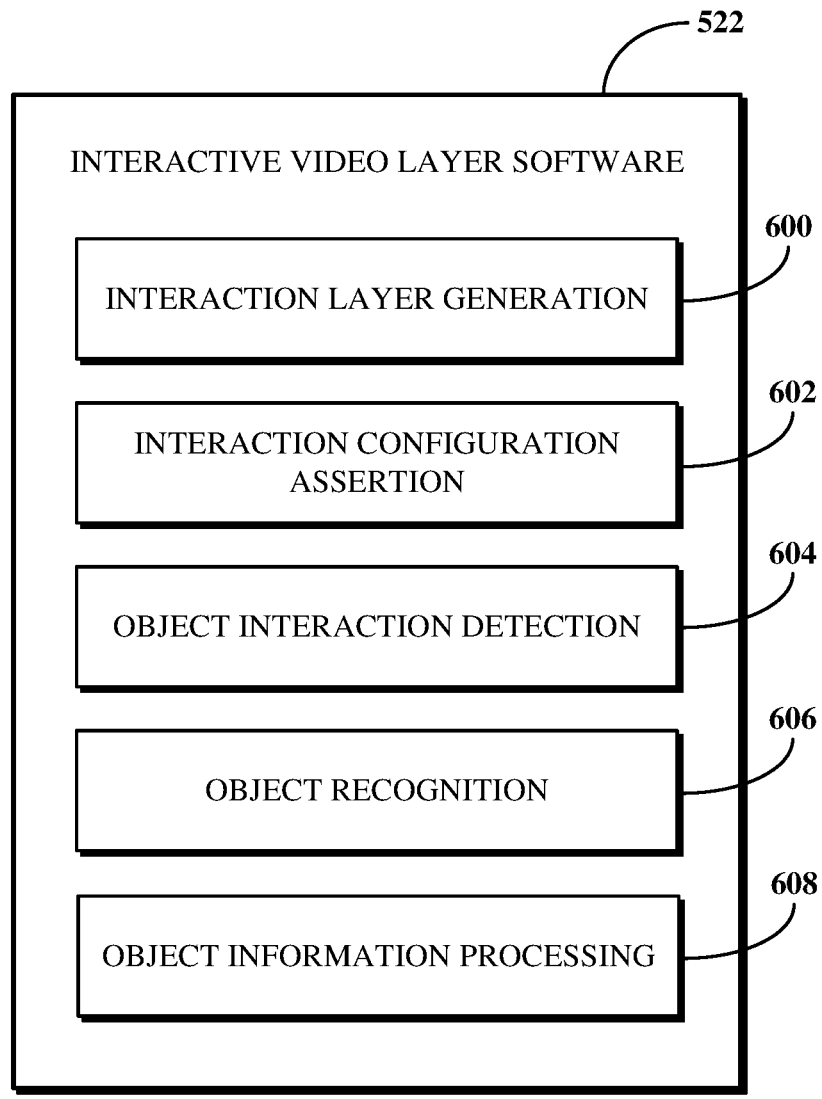
FIG. 6 is a block diagram of an example of functionality of interactive video layer software.

The interactive video layer software 522 will be further described with respect to FIG. 6, which shows a block diagram of an example of functionality of the interactive video layer software 522. The interactive video layer software 522 includes tools, such as programs, subprograms, functions, routines, subroutines, operations, and/or the like, for enabling interactions with objects within video layers of video streams displayed during a video conference. As shown, the interactive video layer software 522 includes an interactive video layer generation tool 600, an interaction configuration assertion tool 602, an object interaction detection tool 604, an object recognition tool 606, and an object information processing tool 608.

The interactive video layer generation tool 600 generates interactive video layers for a subject video stream (e.g., the video stream obtained from the first participant device 504). Each interactive video layer corresponds to one video layer initially included in the video stream when that video stream is obtained (e.g., by the conferencing software 508). The interactive video layer generation tool 600 may first determine the initial video layers of the video stream. Determining the initial video layers of the video stream may include performing segmentation to segment contents of the video stream into different layers. For example, determining the initial video layers of the video stream may include obtaining metadata or other data associated with the video stream from the conferencing software 508. In one particular example, the conferencing software 508 may receive such metadata or other data within or alongside the video stream from the first participant device 504 (e.g., as side information transmitted along with or within the video stream). The metadata or other data identifies the video layers initially included in the video stream. For example, the metadata or other data may specifically identify the video layers specifically or indicate those video layers based on an identification of various video stream content as corresponding to those video layers. In another example, where the video stream is initially obtained as including a single video layer, the metadata or other data may identify or otherwise correspond to content of the video stream, and the interactive video layer generation tool 600 may separate the content the video stream into multiple video layers for further processing by the interactive video layer software 522 based on the metadata or other data.

To illustrate, the video stream obtained from the first participant device 504 may include a foreground layer and a background layer. The foreground layer includes content depicting the user of the first participant device 504, as a participant to the subject video conference, and any objects which may be held by the user of the first participant device 504 at a given time during the video conference. The background layer includes content depicting what is behind the user of the first participant device 504 within the location at which the first participant device 504 is transmitting the video stream. For example, the background layer may include various objects, structures, or the like in a room in which the user of the first participant device 504 is seated during a video conference. The interactive video layer software 522 processes metadata or other data of the video stream itself or accompanying the video stream to identify the foreground layer and the background layer. For example, the metadata or other data may be metadata or data generated at the first participant device 504 to identify the separate foreground and background layers of the video stream. In another example, the metadata or other data identifies content of the video stream without separate video layers having been represented therein (e.g., by the client application 510), and the interactive video layer generation tool 600 processes such content to identify which corresponds to a foreground layer (i.e., based the content depicting a person or one or more objects held by the person) and which corresponds to a background layer (i.e., content not identified as corresponding to the foreground layer).

In some cases, the background layer may be or otherwise correspond to a virtual background of the conference participant. In such a case, the video stream is transmitted from the first participant device 504 as a composite video stream in which each video frame thereof is produced at the client application 510 by combining foreground content of the video stream (i.e., portions of the video stream depicting the user of the first participant device 504 and any objects held by them) with a virtual background selected by or otherwise for the user of the first participant device 504. Where a virtual background is used, the metadata or other data obtained from the first participant device 504 indicates the use of the virtual background, and the virtual background signaled within the video stream will be identified as the background layer, with other content being identified as corresponding to one or more other initial video layers.

Figure 7:
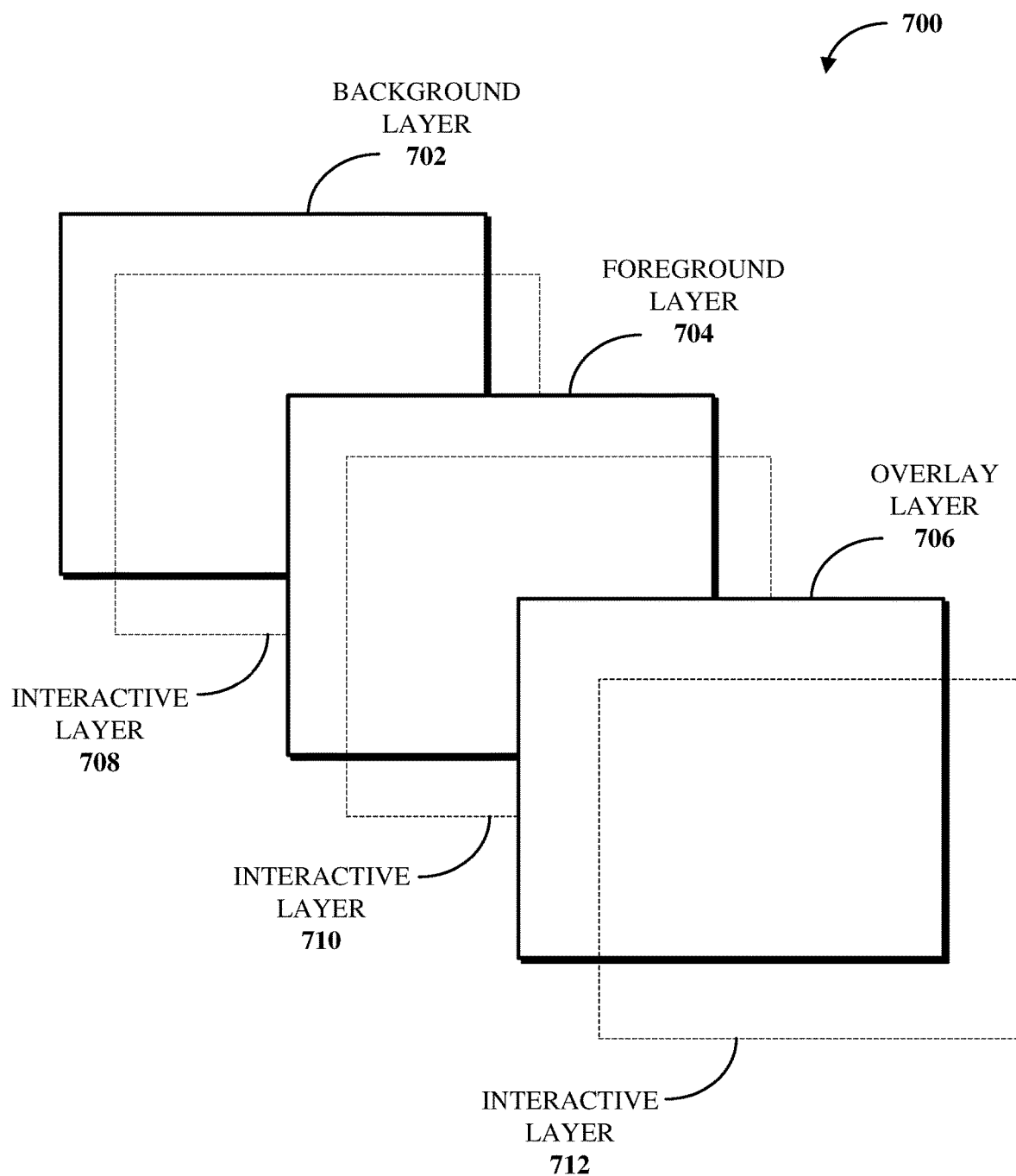
FIG. 7 is an illustration of an example of video layers of a video stream output for display during a video conference.

Once the initial video layers of the video stream are identified, interactive video layers corresponding to those initial video layers are generated and introduced within the video stream. Each interactive video layer corresponds to a different one of the initial video layers. Each of the initial video layers will have a single interactive video layer corresponding thereto. Referring to FIG. 7, an illustration of an example of video layers of a video stream 700 output for display during a video conference is shown. In particular, the video stream 700 is a video stream of a video conference participant, for example, the video stream obtained at the server device 502 from the first participant device 504. The video stream 700 includes three layers initially (i.e., before interactive video layers are introduced)—a background layer 702, a foreground layer 704, and an overlay layer 706.

The background layer 702 may, for example, depict objects behind the user of the first participant device 504 relative to a direction that the camera 514 is pointing. Alternatively, the background layer 702 may depict objects within a virtual background used to produce the video stream at the client application 510. The foreground layer 704 may, for example, depict the user of the first participant device 504. The overlay layer 706 may, for example, represent so-called "lower thirds" information such as information associated with the user of the first participant device 504 (e.g., name, pronunciation information, set of pronouns, or job title), information associated with information associated with an entity to which that user belongs (e.g., a name of or website for their corporate employer), or regional information (e.g., weather or location).

The interactive video layer generation tool 600 identifies the background layer 702, the foreground layer 704, and the overlay layer 706 and accordingly generates interactive video layers 708, 710, and 712. In particular, the interactive video layer 708 is generated and introduced within the video stream 700 to correspond to the background layer 702, the interactive video layer 710 is generated and introduced within the video stream 700 to correspond to the foreground layer 704, and the interactive video layer 712 is generated and introduced within the video stream 700 to correspond to the overlay layer 706. Generating the interactive video layers 708, 710, and 712 includes generating (e.g., producing or computing), for each of the respective layers 702, 704, and 706, new video layers with content that is spatially mapped to co-located content in the respective layers 702, 704, and 706. Introducing the interactive video layers 708, 710, and 712 includes adding the interactive video layers 708, 710, and 712 at appropriate locations within a stack of video layers for the video stream. For example, referring to the background layer 702 as a first or lowest layer, the interactive video layer 708 is added to the video stream layer stack after or otherwise on top of the background layer 702. The foreground layer 704 is after or otherwise on top of the interactive video layer 708, and the interactive video layer 710 is after or otherwise on top of the foreground layer 704. Finally, the overlay layer 706 is after or otherwise on top of the interactive video layer 710, and the interactive video layer 712 is after or otherwise on top of the overlay layer 706.

The interactive video layers introduced within the video stream are configured to receive interactions from one or more participant devices connected to the video conference. That is, because the content of a given initial layer (e.g., one of the layers 702, 704, and 706) covers only a portion of the entire user interface tile display area within which the subject video stream is output for display, different visible portions of a video stream displayed within a given user interface tile are recognized as corresponding to potentially different video layers. For example, for a given video frame of the video stream which initially includes the layers 702, 704, and 706 and has been modified to include the interactive video layers 708, 710, and 712, a conference participant may interact with a first portion depicting a person by interacting with the interactive video layer 710 (corresponding to the foreground layer 704 in which the person is depicted) or a second portion depicting an object behind the person by interacting with the interactive video layer 708 (corresponding to the background layer 702 in which the object is depicted).

Referring back to FIG. 6, the interaction configuration assertion tool 602 asserts an interaction configuration against one or more relevant objects during a subject video conference to limit (e.g., temporarily or entirely prevent) interactions with those one or more objects during that video conference. An interaction configuration may be defined based on input obtained from a user of a participant device prior to or during a video conference. In particular, the user of the participant device may specify one or more objects for which to limit interactions from other participant devices during one or more video conferences (e.g., for an in-progress video conference, a next upcoming video conference, the next N video conferences (in which N is an integer greater than or equal to one), or all future video conferences). For example, where the configuration is for an in-progress video conference, the user of the participant device may specify one or more objects by dragging their mouse or otherwise using a touchscreen interface to surround the one or more objects (e.g., individually or as a group), thereby creating a bounding box surrounding the one or more objects with which to limit interactions by other conference participants. In another example, where the configuration is to be applied for an in-progress video conference, the user of the participant device may click on an object within their video stream to indicate to disallow interactions with it by other conference participants. In yet another example, where the configuration is for an in-progress video conference or specified or unspecified future video conference, the user of the participant device may specify the one or more objects with which to limit interactions by other conference participants by inputting text indicating a name and/or a description of the one or more objects.

In some implementations, an interaction configuration may instead identify one or more objects with which to enable interactions from other participant devices during a video conference. For example, rather than objects being generally interactive, the system 500 may allow the user of the first participant device 504 to specify certain objects which may be interacted with during an in-progress video conference, a next upcoming video conference, the next N video conferences (in which N is an integer greater than or equal to one) or all future video conferences. For example, where the configuration is to be applied for an in-progress video conference, the user of the participant device may specify one or more objects by dragging their mouse or otherwise using a touchscreen interface to surround the one or more objects (e.g., individually or as a group), thereby creating a bounding box surrounding the one or more objects to make interactive for other participants. In another example, where the configuration is to be applied for an in-progress video conference, the user of the participant device may click on an object within their video stream to indicate to allow interactions with it by other conference participants. In yet another example, where the configuration is for an in-progress video conference or specified or unspecified future video conference, the user of the participant device may specify the one or more objects to make interactive by inputting text indicating a name and/or a description of the one or more objects. In some implementations in which the interaction configurations indicate objects for which to enable interactions, the interaction configurations may be defined or otherwise generated by a client application running at a participant device from which the subject video stream is obtained (e.g., the client application 510).

The object interaction detection tool 604 detects interactions from participant devices connected to a video conference with objects within a video layer identified by the interactive video layer tool 600. In particular, when another participant device (e.g., the second participant device 506) interacts with the video stream of a participant device (e.g., the first participant device 504), the object interaction detection tool 604 detects that the interaction has occurred and records or otherwise identifies a location within the GUI (displaying the subject video stream) at which the interaction occurred. For example, the location within the GUI can be spatially mapped to a particular interactive video layer of the video stream based on the portion of the video stream corresponding to the location at which the interaction occurred. The content at the subject location, which is of the video layer corresponding to the spatially mapped interactive video layer, may be identified as the object with which the detected interaction corresponds, also referred to as the interacted object.

The object interaction detection tool 604 may in some cases limit interactions with a given object from participant devices. For example, interactions with an object may be limited based on an interaction configuration asserted by or otherwise for a user of a participant device from which a video stream which includes that object is obtained. In another example, interactions with an object may be limited based on the object being partially or wholly hidden from view during the video conference. That is, given that a person depicted within a video stream may move while the camera of their participant device remains fixed at a current location (e.g., where the participant device is a computer using a webcam to capture the video stream therefrom) and/or the camera or the participant device does not remain at a fixed location during the video conference (e.g., where the participant device is a mobile device and the participant is moving the participant device during the video conference), certain movements during the video conference may from time to time cause one or more objects previously visible within the video stream to no longer be visible therein. For example, a conference participant may walk in front of the object and remain at that new position, thereby blocking the object from view. In such a case, where an object has become partially or wholly blocked, the object interaction detection tool 604 restricts interactions with the object based on a spatial mapping of the location within the GUI at which the interaction occurred to the object being unavailable.

The object recognition tool 606 determines information associated with the object with which an interaction was detected by the object interaction detection tool 604. The information associated with the object includes information usable to identify one or more of what the specific object is, what type of object the object is, or a source (e.g., manufacturer, author, or artist) of the object. The information associated with the object may be determined in one or more ways. In one example, manual user input obtained from the participant device corresponding to the video stream (e.g., the first participant device 504) may specify the information associated with the object. For example, the user of the participant device may enter the manual user input within one or more text fields of a client application used to connect the participant device to the video conference (e.g., the client application 510). In some such cases, the manual user input may be presented when interaction configurations identifying objects which may be interacted with are asserted, or otherwise in connection with such assertion. For example, the user of the first participant device 504 may, for each object indicated within the interaction configurations as being capable of interaction from other participant devices, provide separate input with the information associated with those objects.

In another example, the information associated with the object may be accessed, retrieved, identified, or otherwise determined in response to a first interaction with the object during the video conference. For example, the object recognition tool 606 may receive an indication from the object interaction detection tool 604 that a given object has been interacted with from a participant device. The object recognition tool 606 may thereafter transmit a request for identifying information of the object, such as to an external source 524. The external source 524 is an information source external to the conferencing software 508 and the interactive video layer software 522 which may process a request received from the interactive video layer software 522 to determine and transmit, to the interactive video layer software 522, the information associated with the object.

In one example, the external source 524 may be a text-based or image-based Internet search engine. For example, upon an object being identified as an interacted object, a screen capture depicting the object (e.g., cropped from within the video stream displayed within the GUI of the video conference) may be used for a reverse image search. In some such cases, the interactive video layer software 522 may invoke a call to an application programming interface (API) associated with the external source 524 to facilitate the reverse image search. In another example, upon the object being identified as an interacted object, text depicted on the object may be identified, such as using optical character recognition (OCR) processing, and used as the query for a text-based Internet search.

In another example, the external source 524 may be a specific website, software platform, software service, or the like which has been linked to the video conference, the conferencing software 508, or the software platform implementing the conferencing software 508 (e.g., the software platform 300). For example, the user of the first participant device 504, an administrator of an account for an entity with which the user is associated, or another person may specify one or more such external sources as default external sources to be searched based on objects with which interactions are detected during a video conference. The default external sources may, for example, be or include online marketplaces, online encyclopedias, or websites associated with the providers of various goods and/or services. In some such cases, the interactive video layer software 522 may leverage an API of such a default external source to transmit the request for the information associated with the object thereto.

Once the information associated with the object has been determined, it may be stored in connection with the video conference for future use during the video conference, such as in response to a later interaction detected from the same participant device (e.g., the second participant device) or another participant device connected to the video conference. For example, storage of the information associated with the object may prevent unnecessary resource expenditure and latencies by recalling the information associated with the object at one or more other times during the video conference. Alternatively, in some cases, information associated with a given object may be determined as described above each time the object is interacted with during the video conference.

The object information processing tool 608 presents the information associated with the interacted object within a GUI associated with the video conference. The information associated with the object is presented within a GUI associated with the video conference. In particular, the information associated with the object is presented within a user interface tile within the GUI, in which the user interface tile is associated with the conference participant whose video stream includes the interacted object, and is visible only at the participant device from which the object interaction was detected. For example, the information associated with the object may be presented within a user interface tile which displays the video stream that includes the object. In one such case, the information associated with the object may be presented within a pop-up or prompt at a location of the object within the user interface tile. The user interface file associated with the user of the first participant device 504, which is the one that displays the video stream, is included in the GUI associated with the video conference, which is output at both of the display 516 and the display 520. However, because the interaction with the object was detected as being from the second participant device 506, the information associated with the object may only be output within the GUI (i.e., within the user interface tile) at the display 520 and not also at the display 516. Alternatively, the information associated with interacted object may be presented within the GUI of the video conference at multiple or even all participant devices connected to the video conference. In another example, the information associated with the object may be presented other than within a user interface tile which displays the video stream that includes the object. In some such cases, the information associated with the object may be presented within a prompt or pop-up window accessible from within the video conference, such as a secondary window associated with the GUI of the video conference.

Although the tools 600 through 608 are shown as separate tools, in some implementations, two or more of the tools 600 through 608 may be combined into a single tool. Although the tools 600 through 608 are shown as functionality of the interactive video layer software 522 as a single piece of software, in some implementations, some or all of the tools 600 through 608 may exist outside of the interactive video layer software 522. Similarly, in some implementations, a software service using the interactive video layer software 522 (e.g., the conferencing software 508) may exclude the interactive video layer software 522 while still including the some or all of tools 600 through 608 in some form elsewhere or otherwise make use of the tools 600 through 608 while some or all of the tools 600 through 608 are included in some form elsewhere.

Figure 8A:
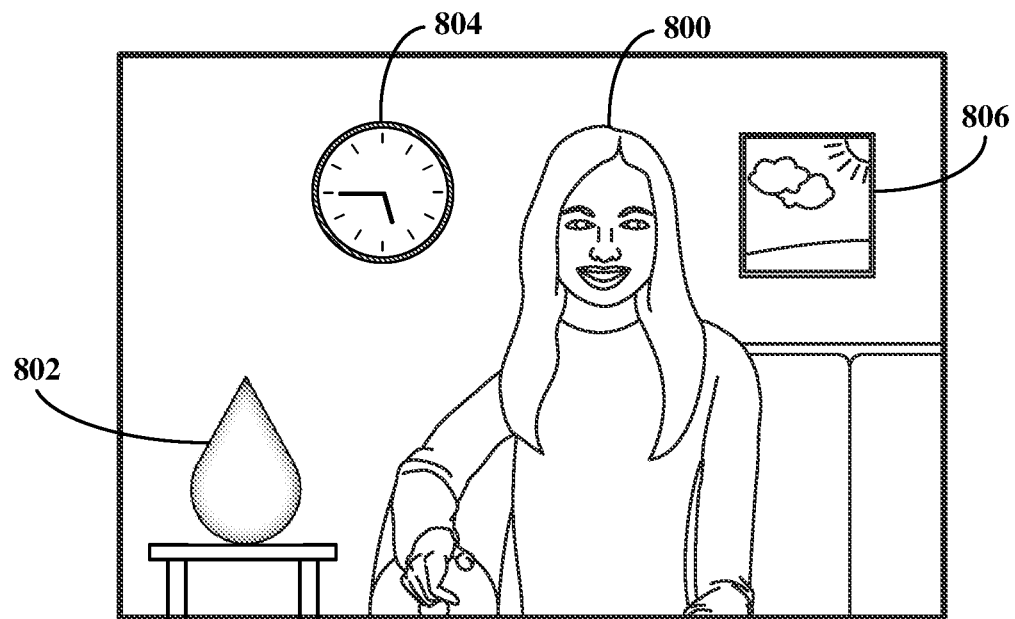
FIGS. 8A-B are illustrations of example graphical user interfaces (GUIs) of a participant-to-participant video conference facilitated using interactive video layers.
Figure 8B:

Example use cases are now described with reference to examples of GUIs which may be output for display to a participant device during a video conference facilitated using an interactive video layer system, such as the system 500. FIGS. 8A-B are illustrations of example GUIs of a participant-to-participant video conference facilitated using interactive video layers. In FIG. 8A, a user 800 of a participant device (e.g., the first participant device 504) is shown within a GUI of the video conference (e.g., within a user interface tile within which a video stream obtained from that participant device is displayed) as sitting on a couch in front of some objects, including a vase 802, a clock 804, and a painting 806. At some point during the video conference, a user of another participant device (e.g., the second participant device 506) may become interested with the vase 802 and interact with it, such as by clicking on it using a mouse (e.g., as the input component 518). In FIG. 8B, a pop-up 810 is presented within the GUI of the video conference based on the interaction with the vase 802. The pop-up 810 includes information associated with the vase 802, in this case, a determined name of the vase 802 and hyperlinked website at which the vase 802 may be available to purchase. For example, the name of the vase 802 may be determined by a reverse image search performed using an Internet search engine (e.g., as the external source 524) using a cropped portion of the video stream depicting the vase 802. In another example, the name of the vase 802 may have been pre-populated, such as by the user 800. The user of the other participant device may accordingly interact with the hyperlink within the pop-up 810 to cause a web browser running at or otherwise installed on that other participant device to connect to the hyperlinked website.

The interaction with the vase 802 and/or any other object within the video stream depicted in the GUI of the video conference may be limited at a given time during the video conference based on whether or not the vase 802 and/or such other object is obscured from view within the GUI at such a given time and/or based on a configuration asserted by or on behalf of the user 800. For example, while not shown, at some point during the video conference the user 800 may stand up from their couch and walk in front of the vase 802, entirely or substantially blocking it from view within the video stream. In such a case, the vase 802 would no longer be available for interaction until it returns to view within the video stream (i.e., by the user 800 moving away from their position in front of the vase 802). In some such cases, where the user of the other participant device had already interacted with the vase 802 so as to cause the pop-up 810 to be presented within the GUI of the video conference, the pop-up 810 may remain within the GUI notwithstanding the user 800 blocking the vase 802 from view within the video stream. However, in other such cases, the pop-up 810 may be temporarily or otherwise removed from the GUI of the video conference. In another example, a configuration asserted by or otherwise on behalf of the user 800 may limit (e.g., temporarily or entirely prevent) interactions with one or more objects depicted within the video stream of the user 800, for example, the clock 804. In such a case, interactions by the other participant with the clock 804 will not cause a pop-up like the pop-up 810 to be presented within the GUI of the video conference.

Figure 9A:
FIGS. 9A-B are illustrations of example GUIs of a contact center engagement video conference facilitated using interactive video layers.
Figure 9B:
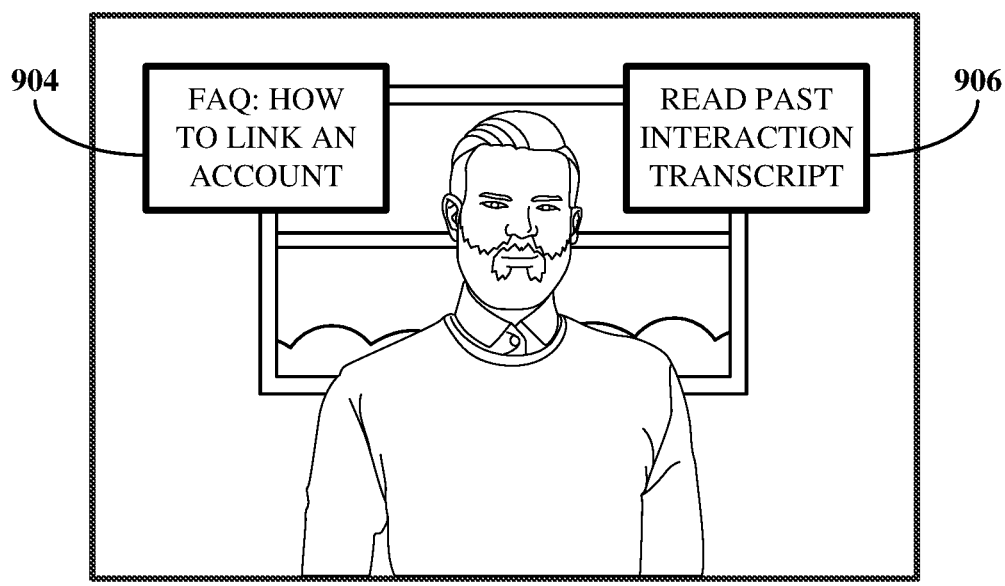

FIGS. 9A-B are illustrations of example GUIs of a contact center engagement video conference facilitated using interactive video layers. In FIG. 9A, a user 900 of a participant device (e.g., the first participant device 504) is a contact center agent depicted within a video stream obtained from that participant device. The user 900 is in particular depicted on a foreground layer of the video stream, while a window is depicted on a background layer thereof. The video conference enables a contact center user, who is using another participant device connected to the video conference (e.g., the second participant device 506) to engage with the user 900 over a video modality, regardless of whether participant device of the contact center user is transmitting its own video stream depicting the contact center user. During the video conference, the contact center user asks the user 900 about how to link an external account to their account with a software platform associated with the contact center (e.g., the software platform 300), and the contact center user mentions that they have asked about this same topic in the past with a different contact center agent.

Based on such discussion by the contact center user, in FIG. 9B, an interactive object 904 and an interactive object 906 appear within the video stream of the user 900, for example, within an overlay layer of the video stream. The interactive object 904, when interacted with by the contact center user, will present frequently asked questions on how to link an account within the GUI of the video conference (e.g., by expanding the interactive object 904 within the GUI). The interactive object 906, when interacted with by the contact center user, will present a transcript of the prior contact center engagement during which the contact center user inquired about account linking within the GUI of the video conference (e.g., by expanding the interactive object 906 within the GUI). In some implementations, clicking on the interactive object 904 or the interactive object 906 may cause a web browser running at the participant device of the contact center user to connect a webpage including the subject text.

Figure 10A:
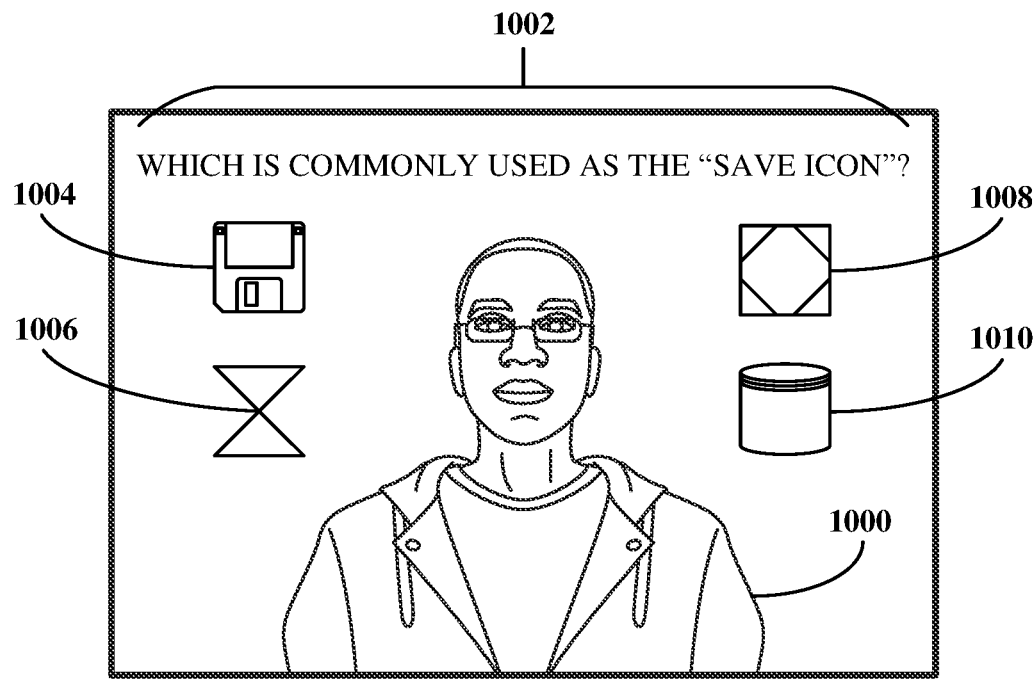
FIGS. 10A-B are illustrations of example GUIs of an online learning video conference facilitated using interactive video layers.
Figure 10B:
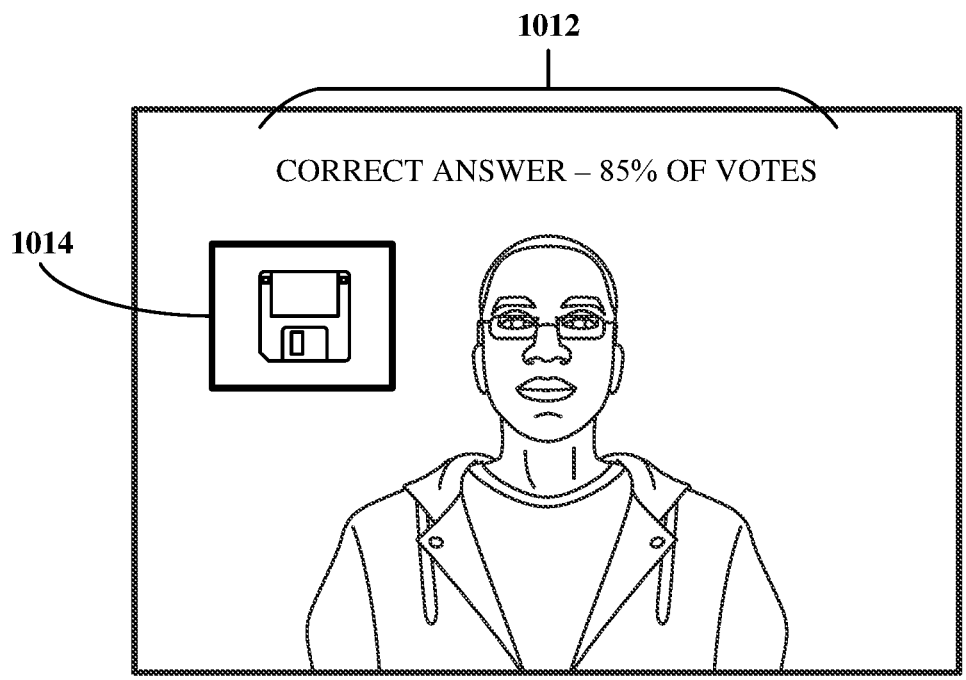

FIGS. 10A-B are illustrations of example GUIs of an online learning video conference facilitated using interactive video layers. In FIG. 10A, a user 1000 of a participant device (e.g., the first participant device 504) is a teacher giving a lesson to a group of students connected to the video conference. In particular, the user 1000 is testing the students' knowledge of a topic, in this case, computer icons. Text 1002 appearing within the GUI of the video conference asks the students, as other participants of the video conference, to identify which of four objects 1004, 1006, 1008, or 1010 depicted within the GUI is commonly used as a "save icon." Here, the depicting of the user 1000 may be within a foreground layer of the video stream obtained from the participant device of the user 1000, and the text 1002 as well as the objects 1004, 1006, 1008, and 1010 may be depicted within an overlay layer of the video stream. Each of the students, from their own participant devices connected to the video conference (e.g., as various second participant devices 506), may interact with (e.g., click on, using a mouse as the input component 518) one of the objects 1004, 1006, 1008, and 1010 so as to vote for the one that they believe correctly answers the question presented within the text 1002.

In FIG. 10B, the correct answer of the question presented within the text 1002 of FIG. 10A is shown by text 1012. The four objects 1004, 1006, 1008, and 1010 previously shown in FIG. 10A are replaced by a new object 1014 which includes the object 1004, as the object which correctly answered the question presented within the text 1002, surrounded by a border so as to draw attention thereto. The text 1012 identifies that the object 1004 was the correct answer. In this example, the text 1012 also indicates that 85 percent of votes from students were for the object 1004. In some cases, a vote percentage may not be indicated within the text 1012. In some implementations, the object 1004 may remain within GUI instead of the new object 1014 replacing it. For example, the object 1004 alone may remain within the GUI so as to indicate that it is the correct answer to the question presented in the text 1002, while the other objects 1006, 1008, and 1010 are removed from the GUI. In another example, all four of the objects 1004, 1006, 1008, and 1010 may remain within the GUI. In some cases where all four of the objects 1004, 1006, 1008, and 1010, the object 1004 may be visually emphasized, for example, by a box being presented around it, by an appearance of the other objects 1006, 1008, and 1010 being changed (e.g., by those objects 1006, 1008, and 1010 appearing faded), or the like.

Other use cases beyond those described above with respect to FIGS. 8A-10B may be used with an interactive video system as disclosed herein, such as the system 500. For example, in a participant-to-participant video conference example, a book shown in a user's background can be interacted with to deliver the interacting user to an online marketplace page at which they can buy the book. In such a case, the interactive video layer system may, for example, perform object recognition to determine that the object is a book and then search an online book marketplace based on text identified on the object (e.g., an author and/or title of the book). In another participant-to-participant video conference example, a conference participant who experiences poor connection quality (e.g., due to local bandwidth limitations) may be presented with an interactive object within their own user interface tile or that of another conference participant, which when interacted with, indicates such connectivity issues to the other conference participants and optionally connects the participant with a website with common troubleshooting tips. In yet another participant-to-participant video conference example, a uniform resource locator (URL) appearing within shared media content shared during the video conference may be recognized and made into an interactive object that, when interacted with, will cause a web browser at the participant device of a subject conference participant to open and navigate to the URL. In a contact center engagement video conference example, the contact center agent may have assigned to them a virtual background populated using to include objects representing or linking content relevant to the subject contact center user, such as their account number, knowledgebase articles, topics for troubleshooting, past tickets, or the like. In a webinar video conference example, a featured product can be interacted with in the video conference to open a link to purchase the product, a document with marketing materials for the product, or the like. In an online learning video conference example or an entertainment-based video conference example (e.g., in which a television show or like visual publication is presented within a GUI of the video conference), a poll may track interactions by conference participants with various objects, such as to allow audience members of a reality television show to vote for their favorite characters by clicking on them within a video stream of the television show, or to allow students remotely connecting to an online lecture to vote for their favorite books by clicking on them within such a video stream. In another online learning video conference example or an entertainment-based video conference example, audience members may be given a task to locate and interact with a certain object or type of object, and the first to do so may be awarded a prize (e.g., extra credit for a student or a shout out for a television show audience member). In a general example applicable to one or more types of video conference, a captcha-type system may be implemented to authenticate one or more participants to the video conference by requiring those one or more participants to interact with certain objects or certain types of objects within a video stream. For example, access to the video conference by a participant may be limited based on a successful response to such an authentication request.

In some implementations, an interactive video system, such as the system 500, may be used to deliver interactive video layer functionality as disclosed herein for media other than video streams obtained from participant devices connected to a video conference. For example, a video conference implemented by the conferencing software 508 may be a virtual conference within which users of participant devices are visually represented using graphical models, such as avatars. In such a case, the contents of the video stream from a participant device may be entirely computer-generated rather than captured from the real world using a camera. Initial video layers may be identified based on the segmentation operations described above, and interactive video layers may be generated and introduced within the video stream based on the interactive video layer operations described above.

In some implementations, an interactive video system, such as the system 500, may be used to deliver interactive video layer functionality as disclosed herein for three-dimensional video rather than conventional two-dimensional video as represented using the video streams described above. For example, the system 500 may build (e.g., determine, identify, or otherwise develop) an understanding of locations of contents of a three-dimensional video stream so as to determine the visibility of certain objects from certain vantages. Thus, whereas an object is either visible or not within a conventional two-dimensional video stream based on the video stream being according to the contents captured by a single camera, an object may be visible or not at different locations within a three-dimensional video stream. As such, in some such implementations, multiple perspectives of a given view within the three-dimensional video stream can each be identified as a different video layer.

In some implementations, an interactive video system, such as the system 500, may collect information associated with interactions with objects from participant devices within one or more video conferences for user experience testing. For example, locations, instances, times, and other information associated with interactions with objects may be collected over time and analyzed to determine where conference participants most often interact with objects within a video stream (e.g., the upper right corner), objects that are most frequently interacted with (e.g., books), times during a video conference at which objects are most frequently interacted with (e.g., the beginning, middle, or end), or the like. The collected data may, for example, be used to refine the interactive video system, such as by arranging a GUI of the conferencing software 508 to include certain types of objects, objects at certain video stream locations, and/or objects at certain times during a video conference.

Figure 11:
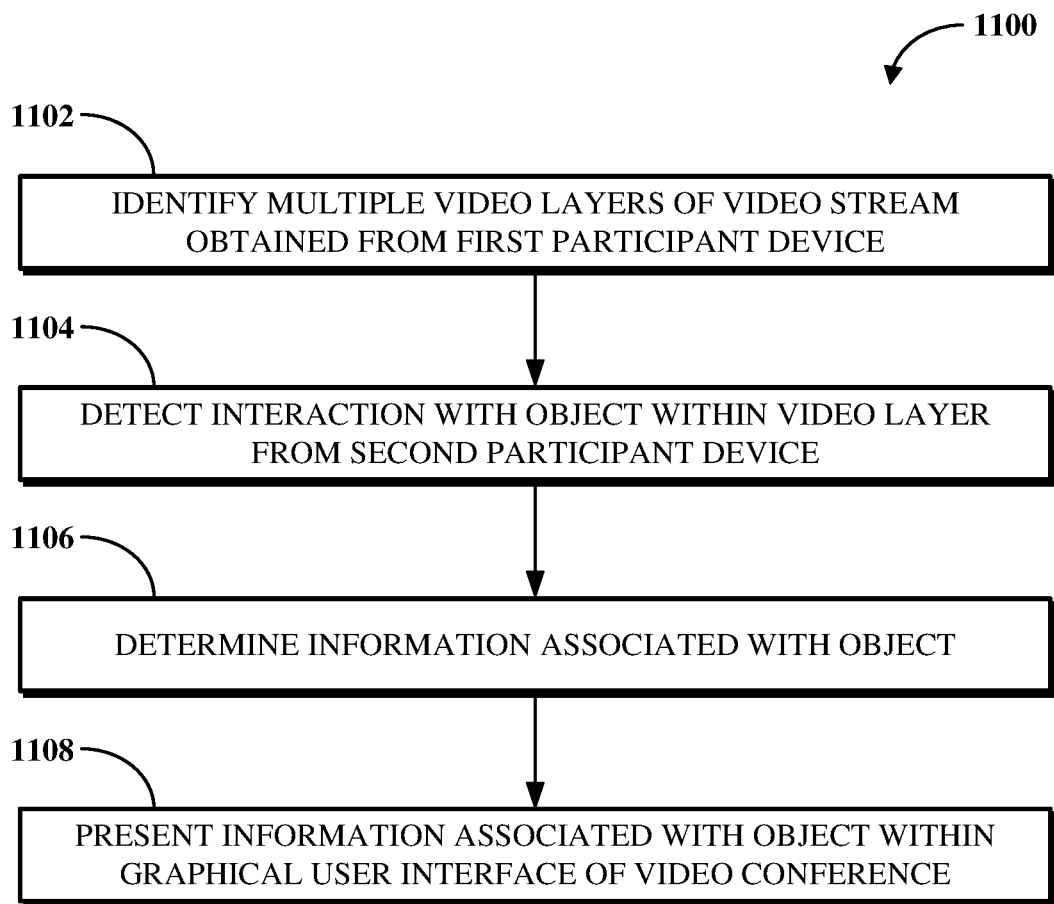
FIG. 11 is a flowchart of an example of a technique for enabling and processing interactions with objects within video layers of a video conference.

To further describe some implementations in greater detail, reference is next made to examples of techniques which may be performed by or using an interactive video layer system. FIG. 11 is a flowchart of an example of a technique 1100 for enabling and processing interactions with objects within video layers of a video conference. The technique 1100 can be executed using computing devices, such as the systems, hardware, and software described with respect to FIGS. 1-10B. The technique 1100 can be performed, for example, by executing a machine-readable program or other computer-executable instructions, such as routines, instructions, programs, or other code. The steps, or operations, of the technique 1100, or another technique, method, process, or algorithm described in connection with the implementations disclosed herein can be implemented directly in hardware, firmware, software executed by hardware, circuitry, or a combination thereof.

For simplicity of explanation, the technique 1100 is depicted and described herein as a series of steps or operations. However, the steps or operations of the technique 1100 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1102, multiple video layers of a video stream obtained from a first participant device connected to a video conference are identified during the video conference. The multiple video layers include multiple initial video layers and multiple interactive video layers corresponding to ones of those initial video layers. The initial layers may include various types of layers, for example, two or more of a background layer depicting background content of the video stream, a foreground layer depicting one or more participants of the video conference, and an overlay layer depicting virtual content of the video stream. Each interactive video layer corresponds to a different one of the initial video layers. For example, the multiple video layers may include at least a foreground layer and a background layer, in which a first interactive video layer is introduced to enable interactions with the foreground layer and a second interactive video layer is introduced to enable interactions with the background layer. The multiple interactive video layers may be generated and introduced within the video stream.

At 1104, an interaction with an object within a video layer of the multiple video layers from a second participant device connected to the video conference is detected during the video conference. The interaction is detected within one of the multiple interactive video layers introduced within the video stream. The interaction may have a different purpose and/or result based on a type of the video conference, a type of the interacted object, or the like. In some cases, the interaction with the object may be based on a request to a user of the participant device from which the interaction is detected. For example, the interaction may correspond to a selection of the object during a voting activity (e.g., a poll, quiz, or the like). In another example, the interaction may correspond to an object presented within a video stream of a contact center agent for interaction by a contact center user in an active contact center engagement with that contact center agent. In some cases, the interaction with the object may be initiated by user action at a participant device, such as without a request from the participant device from which the video stream is obtained. For example, the interaction may correspond to an object within a background of a participant-to-participant video conference in which the user of a participant device wants to learn more about the object.

At 1106, information associated with the object is determined during the video conference. Determining the information associated with the object may include performing object recognition against content of the video stream at the a location within the one of the multiple video layers at which the interaction occurred. Alternatively, determining the information associated with the object may include obtaining input describing the object, such as from a participant device from which the video stream is obtained. The information associated with the object may be based on the type of the object and/or the type of the video conference. For example, where the interaction with the object corresponds to a selection of the object during a voting activity, the information associated with the object may indicate a vote for the object. In another example, the information associated with the object may include a URL associated with the object (e.g., for a website at which the object may be purchased), and determining the information associated with the object may accordingly include determining the URL based on the object (e.g., via a reverse image search or a text-based search). In some cases, where the information associated with the object has already been determined during the video conference, determining the information associated with the object based on the detected interaction therewith may include accessing a record or other data stored in connection with the video conference to include the information associated with the object.

At 1108, the information associated with the object is presented within a GUI of the video conference during the video conference. For example, the information associated with the object may be presented within a user interface tile associated with the participant from whose participant device the video stream is obtained. In some such cases, the information associated with the object may be presented within a pop-up within that user interface tile. In another example, the information associated with the object may be presented within a pop-up, prompt, or other window of the GUI of the video conference. In some cases, the information associated with the object may itself include an interactive element that, when interacted with from a participant device, may trigger some action. For example, the information associated with the object may include a URL for a website at which an interacted object may be purchased, and a user of a participant device from which the object interaction is detected may further interact with that URL within a pop-up in the GUI of the video conference to cause a web browser at their participant device to be directed to the subject website.

In some implementations, the technique 1100 may include asserting interaction configurations against one or more objects shown in the video stream to control interactions with the one or more objects during the video conference. For example, a user of the participant device from which the video stream is obtained may assert the interaction configurations to prevent one or more objects from being interacted with during the video conference. In another example, the user of the participant device from which the video stream is obtained may assert the interaction configurations to enable interactions with one or more objects within the video stream. The interaction configurations may, for example, be defined at the participant device from which the video stream is obtained.

In some implementations, the technique 1100 may include limiting interactions with the object while the object is hidden from view during the video conference. For example, the interaction detected above may be a first interaction with the object. After that first interaction, the user of the participant device from which the video stream is obtained may move in front of the object so as to partially or wholly block it from view within the video stream. In such a case, a further interaction with that object may be precluded while the object remains blocked from view. For example, further interactions with that object may be re-enabled upon the user of the participant device moving away from the object such that the object becomes visible once again.

In some implementations, the technique 1100 may include signaling data associated with the interaction with the object to a host of the video conference. For example, the host of the video conference may receive information identifying interactions with video stream objects during the video conference from participant devices at one or more times during the video conference or after the video conference ends. The information may, for example, participants who interacted with objects, participants whose video streams were interacted with, and/or objects which were interacted with, along with numbers and/or times of occurrences of such interactions. In some such implementations, the data may be signaled to the host of the video conference within a summary of the video conference after the video conference ends, such as along with a copy of a recording and/or transcript of the video conference.

The implementations of this disclosure correspond to methods, non-transitory computer readable media, apparatuses, systems, devices, and the like. In some implementations, a method comprises identifying, during a video conference, multiple video layers of a video stream obtained from a first participant device connected to the video conference; detecting, during the video conference, an interaction with an object within one of the multiple video layers from a second participant device connected to the video conference; and presenting, during the video conference, information associated with the object within a graphical user interface associated with the video conference based on the interaction. In some implementations, a non-transitory computer readable medium stores instructions operable to cause one or more processors to perform operations comprising identifying, during a video conference, multiple video layers of a video stream obtained from a first participant device connected to the video conference; detecting, during the video conference, an interaction with an object within one of the multiple video layers from a second participant device connected to the video conference; and presenting, during the video conference, information associated with the object within a graphical user interface associated with the video conference based on the interaction. In some implementations, an apparatus comprises a memory and a processor configured to execute instructions stored in the memory to identify, during a video conference, multiple video layers of a video stream obtained from a first participant device connected to the video conference; detect, during the video conference, an interaction with an object within one of the multiple video layers from a second participant device connected to the video conference; and present, during the video conference, information associated with the object within a graphical user interface associated with the video conference based on the interaction.

In some implementations of the method, non-transitory computer readable medium, or apparatus, the method comprises, the operations comprise, and the processor is configured to execute the instructions for introducing multiple interactive video layers to the video stream, wherein each interactive video layer of the multiple interactive video layers corresponds to a different one of the multiple video layers, and wherein the interaction is detected within one of the multiple interactive video layers.

In some implementations of the method, non-transitory computer readable medium, or apparatus, the method comprises, the operations comprise, and the processor is configured to execute the instructions for asserting interaction configurations against one or more objects shown in the video stream to control interactions with the one or more objects during the video conference.

In some implementations of the method, non-transitory computer readable medium, or apparatus, the interaction corresponds to a selection of the object during a voting activity, and the information associated with the object indicates a vote for the object.

In some implementations of the method, non-transitory computer readable medium, or apparatus, the information associated with the object includes a uniform resource locator associated with the object, and the method comprises, the operations comprise, and the processor is configured to execute the instructions for determining the uniform resource locator based on the object.

In some implementations of the method, non-transitory computer readable medium, or apparatus, the method comprises, the operations comprise, and the processor is configured to execute the instructions for limiting interactions with the object while the object is hidden from view during the video conference.

In some implementations of the method, non-transitory computer readable medium, or apparatus, the method comprises, the operations comprise, and the processor is configured to execute the instructions for signaling data associated with the interaction to a host of the video conference.

In some implementations of the method, non-transitory computer readable medium, or apparatus, the video conference is between a contact center user and a contact center agent, the video stream is of the contact center agent, and the object is presented for interaction by the contact center user.

In some implementations of the method, non-transitory computer readable medium, or apparatus, the video conference is a virtual conference in which participants are visually represented by avatars and the video stream depicts virtual content associated with one of the avatars.

In some implementations of the method, non-transitory computer readable medium, or apparatus, the multiple video layers include two or more of a background layer depicting background content of the video stream, a foreground layer depicting one or more participants of the video conference, and an overlay layer depicting virtual content of the video stream.

In some implementations of the method, non-transitory computer readable medium, or apparatus, the method comprises, the operations comprise, and the processor is configured to execute the instructions for determining the information associated with the object by performing object recognition against content of the video stream at the a location within the one of the multiple video layers at which the interaction occurred.

In some implementations of the method, non-transitory computer readable medium, or apparatus, identifying the multiple video layers comprises identifying multiple initial video layers of the video stream as received from the first participant device; and generating a different interactive video layer for each of the multiple initial video layers, wherein the multiple video layers includes the multiple initial video layers and each of the different interactive video layers.

In some implementations of the method, non-transitory computer readable medium, or apparatus, the interaction with the object is based on a request to a user of the second participant device.

In some implementations of the method, non-transitory computer readable medium, or apparatus, the multiple video layers include at least a foreground layer and a background layer, and a first interactive video layer is introduced to enable interactions with the foreground layer and a second interactive video layer is introduced to enable interactions with the background layer.

In some implementations of the method, non-transitory computer readable medium, or apparatus, the method comprises, the operations comprise, and the processor is configured to execute the instructions for limiting interactions with the object based on a configuration asserted for a user of the first participant device.

In some implementations of the method, non-transitory computer readable medium, or apparatus, the information associated with the object includes a hyperlink to a website associated with the object.

In some implementations of the method, non-transitory computer readable medium, or apparatus, the object is introduced within the one of the multiple video layers based on a connection quality of the second participant device to the video conference.

In some implementations of the method, non-transitory computer readable medium, or apparatus, the object is introduced within the one of the multiple video layers based on a discussion during the video conference.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   obtaining, during a video conference, a video stream depicting multiple objects from a first participant device connected to the video conference;
   detecting, from a second participant device connected to the video conference during the video conference, an interaction with an object of the multiple objects within one of multiple video layers of the video stream; and
   presenting, during the video conference, information associated with the object within a graphical user interface associated with the video conference based on the interaction.

2. The method of claim 1, comprising:
   introducing multiple interactive video layers to the video stream,
   wherein each interactive video layer of the multiple interactive video layers corresponds to a different one of the multiple video layers, and
   wherein the interaction is detected within one of the multiple interactive video layers.

3. The method of claim 1, comprising:
   asserting interaction configurations against one or more objects of the multiple objects to control interactions with the one or more objects during the video conference.

4. The method of claim 1, wherein the interaction corresponds to a selection of the object during a voting activity, and wherein the information associated with the object indicates a vote for the object.

5. The method of claim 1, wherein the information associated with the object includes a uniform resource locator associated with the object, the method comprising:
   determining the uniform resource locator based on the object.

6. The method of claim 1, comprising:
   limiting interactions with the object while the object is hidden from view during the video conference.

7. The method of claim 1, comprising:
   signaling data associated with the interaction to a host of the video conference.

8. The method of claim 1, wherein the video conference is between a contact center user and a contact center agent, wherein the video stream is of the contact center agent, and wherein the object is presented for interaction by the contact center user.

9. The method of claim 1, wherein the video conference is a virtual conference in which participants are visually represented by avatars and the video stream depicts virtual content associated with one of the avatars.

10. The method of claim 1, wherein the multiple video layers include two or more of a background layer depicting background content of the video stream, a foreground layer depicting one or more participants of the video conference, and an overlay layer depicting virtual content of the video stream.

11. A non-transitory computer readable medium storing instructions operable to cause one or more processors to perform operations comprising:
   obtaining, during a video conference, a video stream depicting multiple objects from a first participant device connected to the video conference;
   detecting, from a second participant device connected to the video conference during the video conference, an interaction with an object of the multiple objects within one of multiple video layers of the video stream; and presenting, during the video conference, information associated with the object within a graphical user interface associated with the video conference based on the interaction.

12. The non-transitory computer readable medium of claim 11, the operations comprising:
determining the information associated with the object by performing object recognition against content of the video stream at a location within the one of the multiple video layers at which the interaction occurred.

13. The non-transitory computer readable medium of claim 11, wherein the operations for identifying the multiple video layers comprise:
identifying multiple initial video layers of the video stream as received from the first participant device; and
generating a different interactive video layer for each of the multiple initial video layers, wherein the multiple video layers include the multiple initial video layers and each of the different interactive video layers.

14. The non-transitory computer readable medium of claim 11, wherein the interaction with the object is based on a request to a user of the second participant device.

15. An apparatus, comprising:
a memory; and
a processor configured to execute instructions stored in the memory to:
obtain, during a video conference, a video stream depicting multiple objects from a first participant device connected to the video conference;
detect, from a second participant device connected to the video conference during the video conference, an interaction with an object of the multiple objects within one of multiple video layers of the video stream; and
present, during the video conference, information associated with the object within a graphical user interface associated with the video conference based on the interaction.

16. The apparatus of claim 15, wherein the multiple video layers include at least a foreground layer and a background layer, and wherein a first interactive video layer is introduced to enable interactions with the foreground layer and a second interactive video layer is introduced to enable interactions with the background layer.

17. The apparatus of claim 15, wherein the instructions include instructions to: limit interactions with the object based on a configuration asserted for a user of the first participant device.

18. The apparatus of claim 15, wherein the information associated with the object includes a hyperlink to a website associated with the object.

19. The apparatus of claim 15, wherein the processor is configured to execute the instructions to:
determine the information associated with the object during the video conference.

20. The apparatus of claim 15, wherein the processor is configured to execute the instructions to:
access data stored in connection with the video conference to determine the information associated with the object.

* * * * *